United States Patent
Cherewka et al.

(10) Patent No.: US 9,684,322 B2
(45) Date of Patent: Jun. 20, 2017

(54) VOLTAGE LIMITING DEVICE FOR USE IN A DISTRIBUTED CONTROL SYSTEM

(71) Applicant: Phoenix Contact Development and Manufacturing, Inc., Middletown, PA (US)

(72) Inventors: Michael Colin Cherewka, Mechanicsburg, PA (US); Brenton Eugene Helfrick, Middletown, PA (US); Aaron Richard Kreider, Elizabethtown, PA (US)

(73) Assignee: Phoenix Contact Development and Manufacturing, Inc., Middletown, PA (US)

( * ) Notice: Subject to any disclaimer, the term of this patent is extended or adjusted under 35 U.S.C. 154(b) by 136 days.

(21) Appl. No.: 14/430,011

(22) PCT Filed: Sep. 20, 2013

(86) PCT No.: PCT/US2013/060855
§ 371 (c)(1),
(2) Date: Mar. 20, 2015

(87) PCT Pub. No.: WO2014/047409
PCT Pub. Date: Mar. 27, 2014

(65) Prior Publication Data
US 2015/0212529 A1    Jul. 30, 2015

Related U.S. Application Data

(60) Provisional application No. 61/842,413, filed on Jul. 3, 2013, provisional application No. 61/704,359, filed on Sep. 21, 2012.

(51) Int. Cl.
G05F 1/56       (2006.01)
G05F 1/613     (2006.01)
H02H 9/00     (2006.01)

(52) U.S. Cl.
CPC ................ G05F 1/56 (2013.01); G05F 1/613 (2013.01); H02H 9/00 (2013.01); H02H 9/008 (2013.01)

(58) Field of Classification Search
CPC .. H02H 9/00; H02H 9/008; G05F 1/56; G05F 1/613
See application file for complete search history.

(56) References Cited

U.S. PATENT DOCUMENTS 5,684,451 A * 11/1997 Seberger ................ G08C 19/02
                                                             340/12.37
5,686,820 A    11/1997 Riggio, Jr.
(Continued)

FOREIGN PATENT DOCUMENTS

DE    102011036978 A1    8/2012
WO    2007130017 A1    11/2007
WO    2012021681 A2    2/2012

OTHER PUBLICATIONS

International Search Report in corresponding PCT/US2013/060855, Feb. 28, 2014.
Machine translation of DE 102011036978.

*Primary Examiner* — Jue Zhang
(74) *Attorney, Agent, or Firm* — Hooker & Habib, P.C.

(57) ABSTRACT

A voltage limiting device for limiting the voltage being transferred from a trunk circuit to a spur circuit of a distributed control network includes an AC signal device that passes the AC data signals between the trunk circuit and the spur circuit.

20 Claims, 7 Drawing Sheets

(56) References Cited

U.S. PATENT DOCUMENTS

| | | | | |
|---|---|---|---|---|
| 5,835,534 A | * | 11/1998 | Kogure | H02H 9/008 340/12.32 |
| 6,125,448 A | * | 9/2000 | Schwan | G06F 1/266 713/300 |
| 8,467,196 B2 | * | 6/2013 | Rogoll | G05B 19/0423 361/824 |
| 2007/0038390 A1 | * | 2/2007 | Mansfield | H02H 9/008 702/45 |
| 2007/0185588 A1 | * | 8/2007 | El-Sayed | G05B 9/03 700/22 |
| 2009/0146624 A1 | | 6/2009 | Kim et al. | |
| 2010/0222936 A1 | * | 9/2010 | Helfrick | H04L 12/40045 700/292 |
| 2012/0299601 A1 | * | 11/2012 | Kitchener | H02H 9/008 324/537 |

\* cited by examiner

VOLTAGE LIMITING DEVICE FOR USE IN A DISTRIBUTED CONTROL SYSTEM

FIELD OF THE DISCLOSURE

The disclosure relates to a control system for real-time distributed control, and more specifically, to a voltage limiting device usable in providing an inherently safe interface between a trunk circuit and spur circuits of the control system.

BACKGROUND OF THE DISCLOSURE

Automated industrial systems have field devices that monitor, control, and operate an industrial process. The field devices communicate with a control processor through a trunk circuit that transmits DC voltage through a power conditioner to power the field devices and transmits AC voltage data signals (which can include operating commands) superimposed on the DC voltage bi-directionally between the control processor and the field devices.

The field devices can be distributed throughout the industrial plant, and the data transmittal rates allow essentially real-time control of the process. Field devices each attach to the trunk circuit via a spur or drop circuit. The trunk circuit transmits DC voltage to the spur circuit, and carries the AC data signals to and from the spur circuit.

Standardized power and communication protocols have been developed for distributed control systems. For example, the Foundation Fieldbus protocol is an all-digital, serial, two-way communication system that sends DC power and AC signals over a twisted two-wire trunk circuit and enables the control processor to communicate with and control a number of field devices. Other known distributed control systems include the Profibus PA and Ethernet-based control systems.

Field devices may be located in hazardous areas of the plant that present the risk of fire. Hazardous areas are identified by class as to the nature of the risk. Flammable gases are in Class 1 areas, combustible dusts are in Class 2 areas, and ignitable fibers and flyings are in Class 3 areas. Class 0 is a safe area without fire risk.

Hazardous areas are further identified by division and zone as to the level of fire risk. Division 1 identifies areas in which the fire risk is a continuous presence (Zone 0) or in which the fire risk is present only during normal operations (Zone 1). Division 2 identifies hazardous areas in which the fire risk is not expected (Zone 2), but if the risk does occur it is present for only a short period of time.

Distributed control systems having field devices located in hazardous areas may be intrinsically safe. Intrinsically safe control systems are designed so that the energy released during an electrical fault is insufficient to cause ignition within the hazardous area. Conventionally the voltages and currents in the entire control system are reduced to limit the energy release to below the ignition point.

A problem with an intrinsically safe control system is that the limited power available in the system may be insufficient to operate all the field devices in the system, including those in safe areas.

Other control system approaches have been developed that provide sufficient power to operate all field devices, while still providing intrinsic safety for field devices in hazardous areas.

In the entity approach, safety barriers are provided when transitioning from a safe area to an intrinsically safe area. The barrier provides a limited number of spurs that extend into the hazardous area, and limits the amount of energy available to the spurs.

To achieve energy limitation for the hazardous area, both voltage and current must be limited in accordance with intrinsic safety standards. The level to which the voltage and current must be limited is dependent upon which hazardous area the spur is to be connected into. Further, for Division 1 (Zone 0, Zone 1) intrinsic safety, barriers commonly provide galvanic isolation; for Division 2 (Zone 2) intrinsic safety, barriers are not isolated.

For Division 2 (Zone 2) entity systems, the conventional approach is to achieve the voltage limitation at the power conditioner that is supplying energy to the trunk circuit, and the current limitation is provided for in a device coupler. A device coupler enables a device segment consisting of one or more spurs to be attached to the trunk circuit in a modular manner.

Several problems, however, have been identified with this conventional approach:

(a) because the intrinsic safety concept begins at the power conditioner, all equipment connected to the trunk circuit must be limited in accordance with intrinsic safety standards;

(b) intrinsically safe terminals must be physically separated from all non-intrinsically safe terminals. This requirement typically must be observed for all trunk connections, including the power conditioner and any other equipment attached to the trunk circuit;

(c) intrinsically safe signals are not to be carried in the same cable as non-intrinsically safe signals. Trunk circuits are often included as part of multi-core cabling, limiting the use of the other cabling lines; and (d) the lower the output voltage of a power conditioner, the shorter the maximum length of the trunk circuit. Device loading on the segment and cable resistance per unit length limit the maximum trunk circuit length. For example, the maximum voltage of a Fieldbus intrinsically safe power conditioner is typically set to 24 volts because the majority of intrinsically safe field devices are limited to a maximum input voltage of 24 volts. The maximum length of a trunk circuit is significantly shortened as compared to a trunk circuit operating at a higher maximum voltage under normal segment loading conditions.

Thus there is a need for an improved intrinsic safety approach for Division 2 (Zone 2) entity systems that enables the control system to provide sufficient power to operate all field devices while still providing intrinsic safety for those field devices in hazardous areas.

BRIEF SUMMARY OF THE DISCLOSURE

Disclosed is an improved intrinsic safety approach for Division 2 (Zone 2) entity control systems. The approach includes locating a voltage limiting device between the trunk and a spur circuit.

In one possible embodiment, the voltage limiting device may be provided as a unit separate from, but physically co-located with, a device coupler. This enables use of a conventional device coupler with the control system. A current limiting device in series with the voltage limiting device may be included in the unit if the device coupler does not include a current limiting device.

In another possible embodiment, the voltage limiting device may be integrated into a device coupler connectable to the trunk circuit, with the device coupler including connections for a number of spur circuits. A single voltage limiting device may be provided and configured to be in series with all the spur circuits extending from the device coupler. Alternatively, multiple voltage limiting devices may be provided in the device coupler, with each voltage limiting device configured to be in series with a respective one or more of the spur circuits extending from the device coupler.

One or more current limiting devices may also be located in the device coupler, with each voltage limiting device in series with one or more current limiting devices so that the device coupler provides both voltage limitation and current limitation for each spur circuit extending from the device coupler.

Placing voltage limitation at the spur circuits does not create a single point of failure in the control network or the device segment as does placing voltage limitation for the entire system at the power conditioner. Integrating the voltage limiting device into a device coupler, furthermore, reduces the number of products a customer must procure and simplifies segment design.

In an embodiment of the voltage limiting device to limit DC voltage transmitted from a trunk circuit to a spur circuit of a distributed control network in which the trunk circuit cooperates with the spur circuit in transmitting AC data signals superimposed on the DC voltage between a field device attached to the spur circuit and a control processor attached to the trunk circuit, the voltage limiting device includes an input terminal for receiving an input voltage from the trunk circuit and an output terminal for supplying an output voltage to the spur circuit. A voltage regulation device connects the input terminal with the output terminal, the voltage regulation device configured to deliver an output voltage to the output terminal based upon the input voltage from the trunk circuit. The voltage regulation device is operable in a first mode wherein the output voltage is equal to the input voltage, and the voltage regulation device is operable in a second mode wherein the output voltage is equal to a threshold voltage.

A control device is connected to the output terminal and to the voltage regulation device. The control device is configured to place the voltage regulation device in the first operating mode when the voltage at the output terminal is below the threshold voltage. The control device is configured to place the voltage regulation device in the second operating mode when the voltage at the output terminal exceeds the threshold value or would exceed the threshold value if the voltage regulation device were operating in the first mode.

An AC signal device is connected to the input and output terminals in parallel with the voltage regulation device. The AC signal device is configured to carry the AC data signals between the input and output terminals.

Possible embodiments of the control device may include a monitoring device that monitors the voltage difference between the output terminal and a reference voltage. When the voltage difference is at or below a predetermined value, the voltage regulation device is placed in its first operating mode. When the voltage difference exceeds the predetermined value, the voltage regulation device is placed in its second operating mode to limit voltage to the output terminal.

The reference voltage may include a constant voltage reference and an AC follower reference to compensate for DC voltage variation caused by the AC data signal.

In possible embodiments of the AC signal device, the AC signal device includes one or more components (for example, a capacitor, a capacitance element, or an active circuit component) separate from the voltage regulation device. In other possible embodiments of the AC signal device, the AC signal device and the voltage regulation device share common components (that is, the same components make up the AC signal device as well as the voltage regulation device).

The voltage regulation and control devices may be configured to utilize either linear voltage regulation or switch mode voltage regulation (corresponding to the voltage regulation found in conventional linear regulated power supplies and in conventional switching power supplies respectively).

Linear voltage regulation regulates voltage by stepping down a higher input voltage to a lower voltage by varying resistance, with the extra energy dissipated as heat. Switch mode regulation regulates voltage by switching a control element on and off, with energy being stored in an energy storing device (typically a capacitor, an induction coil, or both) during the on cycle and energy withdrawn from the energy storing device during the off cycle.

Embodiments of the voltage limiting device that utilize linear voltage regulation may include a voltage regulation device or linear voltage regulator in which a variable impedance component is placed in series between the input and output terminals. The impedance of the component varies to regulate output voltage when the voltage regulation device is operating in its second mode.

Other embodiments of the voltage limiting device that utilize linear voltage regulation may include a resistor in series between the input and output terminals and a current sink connected to the resistor. The resistance of the current sink varies to regulate voltage across the resistor when the voltage regulation device is operating in its second mode.

Embodiments of the voltage limiting device utilizing switch-mode voltage regulation may use different switch-mode voltage regulation topologies. Examples of known switch-mode voltage regulation topologies that may be adapted for use include, but are not limited to, buck converters, boost converters, buck-boost converters, flyback converters, half-forward converters, push-pull converters, half-bridge converters, full-bridge converters, Cuk converters, SEPIC (single-ended primary-inductor converters), and charge pumps.

Other objects and features will become apparent as the description proceeds, especially when taken in conjunction with the accompanying drawing sheets illustrating one or more embodiments.

DETAILED DESCRIPTION OF EMBODIMENTS

Figure 1:
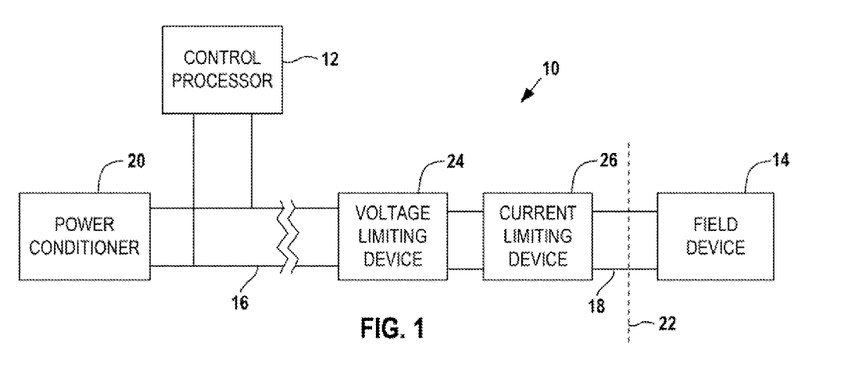
FIG. 1 illustrates a distributed control system.

FIG. 1 illustrates a distributed control system 10 that includes a control processor 12 that transmits and receives AC data signals to and from a field device 14. The control processor 12 is connected to a trunk circuit 16 and the field device 14 is connected to a spur circuit 18 connected to the trunk circuit 16 (to simplify the drawing, the control system 10 is shown as having only one field device 14). The trunk circuit 18 also transmits DC power supplied through a power conditioner 20 to the spur circuit 18 to power the field device 14.

The field device 14 is shown in a Division 2 (Zone 2) hazardous area. The dividing line between the hazardous area and the safe area is represented by the dashed line 22. The spur line 18 extends from the safe area into the hazardous area. A voltage limiting device 24 and a current limiting device 26 are located in the safe area in series between the trunk circuit 16 and the spur circuit 18. The voltage limiting device 24 and the current limiting device 26 limit the voltage and current to the field device 14 in compliance with intrinsic safety standards.

Figure 2:
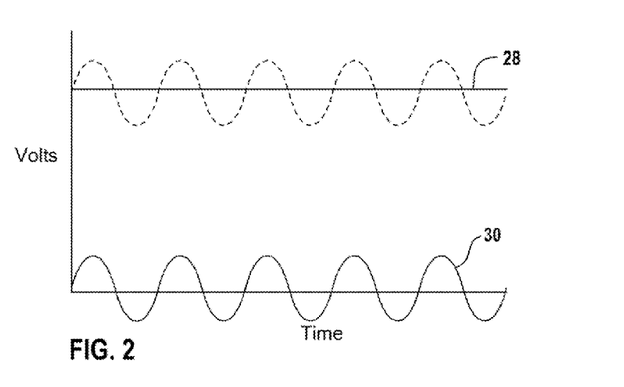
FIG. 2 illustrates the DC voltage component and the AC data signal voltage component transmitted through the trunk circuit of the system shown in FIG. 1.

FIG. 2 illustrates in simplified form the DC voltage 28 for power transmittal and the AC signal voltage 30 transmitted through the trunk circuit 16. The AC signal voltage 30 is superimposed on the DC voltage 28; the resulting voltage carried in the trunk circuit 16 is shown in dotted lines in FIG. 2.

The illustrated power conditioner 20 outputs 32 volts DC to the trunk circuit 16 (that is, the DC voltage 28 is nominally 32 volts). The data signal 30 is an AC voltage signal that conforms to the network communications protocol for the specific control system and is superimposed over the DC voltage 28. The illustrated control system 10 is a Foundation Fieldbus system that utilizes a 31.5 kbit/sec AC data signal.

The illustrated voltage limiting device 24 limits maximum DC voltage 28 delivered to the spur circuit 18 to 24 volts DC while passing the AC signal 28 between the spur circuit 18 and the trunk circuit 16. Construction and operation of embodiments of the voltage limiting device 24 will be described in further detail below. The current limiting device 26 is conventional and so will not be disclosed in further detail.

Figure 3:
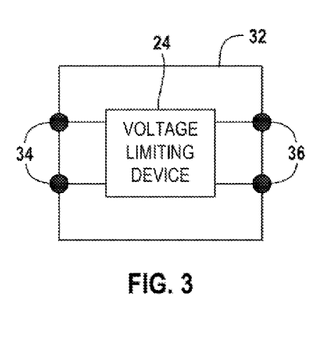
FIG. 3 illustrates a voltage limiting device within a housing.

FIG. 3 illustrates the voltage limiting device 24 housed in a housing 32. The housing 32 has sets of terminals 34, 36 for installing the voltage limiting device 24 into the control system 10.

Figure 4:
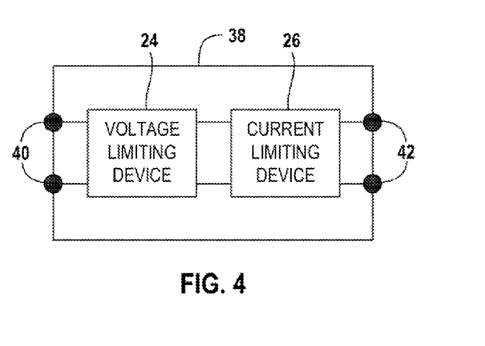
FIG. 4 illustrates a voltage limiting device and a current limiting device in a common housing.

FIG. 4 illustrates the voltage limiting device 24 housed in a housing 38 that also includes the current limiting device 26 connected in series with the voltage limiting device 24. The housing 38 includes sets of terminals 40, 42 for installing the voltage limiting device 24 and the current limiting device 26 into the control system 10.

Figure 5:
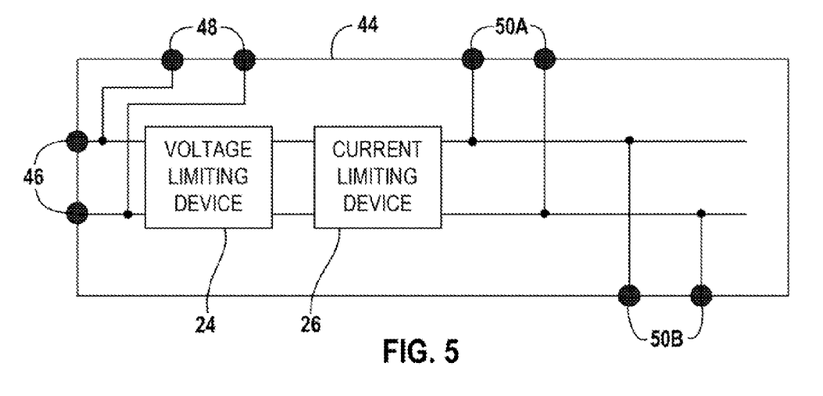
FIG. 5 illustrates a voltage limiting device and a current limiting device housed in a device coupler.

FIG. 5 illustrates the voltage limiting device 24 and the current limiting device 26 housed in a device coupler 44 that enables multiple spur circuits 14 to be attached to the trunk circuit 16. The device coupler 44 includes sets of trunk circuit terminals 46, 48 for extending the trunk circuit 18 to and from the device coupler 44, and sets of spur circuit terminals 50A, 50B for attaching two spur circuits to the device coupler 44. The voltage limiting device 24 is located in series between the trunk circuit terminals and the spur circuit terminals so that the voltage limiting device 24 is in series between the trunk circuit 16 and each spur circuit 18 connected to the device coupler 44. The device coupler may also include other features, such as termination features and the like known in the device coupler art.

Figure 6:
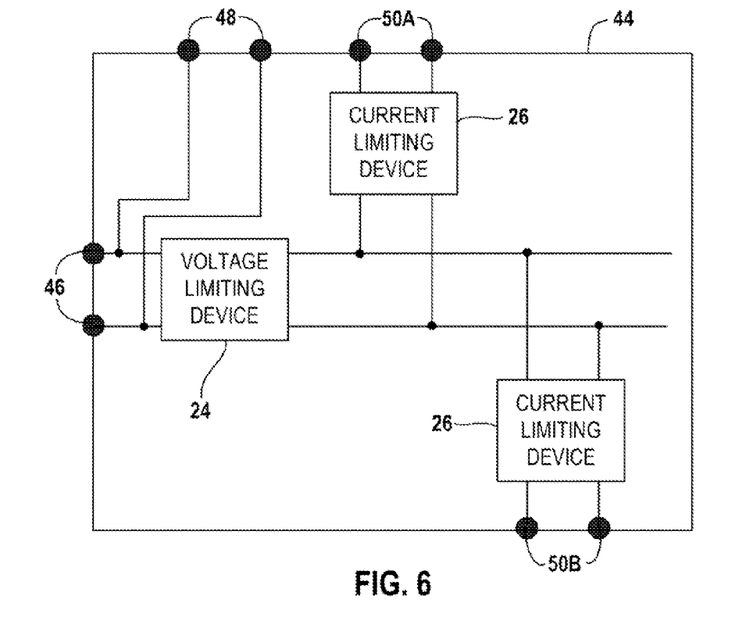
FIG. 6 illustrates a voltage limiting device and multiple current limiting devices housed in a device coupler.

FIG. 6 illustrates an alternative embodiment of the device coupler 44 (with the same reference numerals as used for the device coupler embodiment shown in FIG. 5). In this embodiment the voltage limiting device 24 is in series with a number of current limiting devices 26, each current limiting device 26 in series with a respect set of spur circuit terminals 50A, 50B. A short circuit in one field device 14 or spur circuit 18 does not shut down the other spur circuits.

The device coupler 44 shown in FIGS. 5 and 6 may be connected to field devices 14 located in a hazardous zone. The trunk circuit 16 may extend away from the device coupler 44 and may be connected to other field devices located in safe area. The voltage limiting device 24 enables both intrinsically safe signals and non-intrinsically safe signals to be carried in the same trunk circuit 16.

Figure 7:
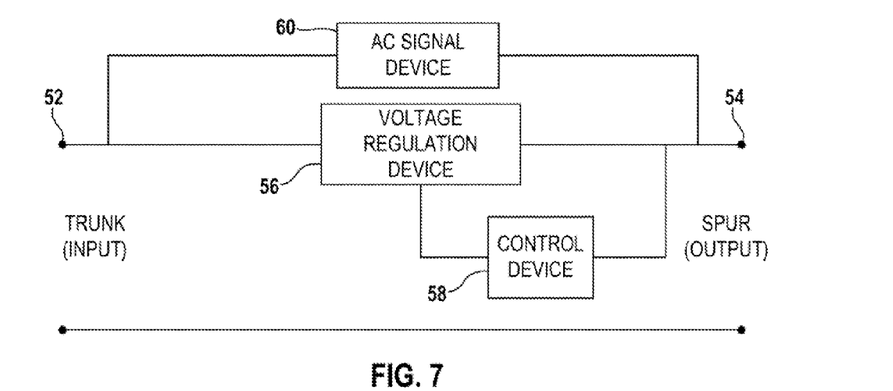
FIG. 7 is a block circuit diagram of a voltage limiting device.

FIG. 7 is a block circuit diagram of the voltage limiting device 24. The voltage limiting device 24 has an input side that connects with the trunk circuit 16 and an output side that connects with the spur circuit 18. Included on the input side is an input terminal 52 that receives an input voltage from the trunk circuit. Included on the output side is an output terminal 54 that supplies an output voltage to the spur circuit. A voltage regulation device 56 connects the input terminal with the output terminal. The voltage regulation device 56 is configured to deliver an output voltage to the output terminal 54 based upon the input voltage at the input terminal 52. The voltage regulation device 56 is operable in two operating modes. The voltage regulation device 56 is operable in a first mode in which the output voltage is equal to the input voltage. The voltage regulation device 56 is also operable in a second mode in the output voltage is equal to a predetermined maximum voltage.

A control device 58 is connected to the output terminal 54 and to the voltage regulation device 56. The control device 58 is configured to use the voltage output at the output terminal 54 place the voltage regulation device 56 in the proper operating mode—the first operating mode when the voltage at the output terminal 54 is at or below the maximum voltage, and the second operating mode when the voltage at the output terminal 54 exceeds the maximum value or would exceed the maximum value if the voltage regulation device 24 were operating in the first mode.

An AC signal device 60 is also connected to the input terminal 52 and output terminal 54. The AC signal device 60 is configured to carry the AC data signals 30 between the input and output terminals while the voltage regulation device 56 is operating in the second mode and regulating voltage, and may also carry the AC data signals at all times.

In operation, if the DC voltage at the output terminal 54 is below the maximum DC voltage (in the illustrated embodiment the maximum DC voltage is 24 volts), the control system 58 places the voltage regulation device 56 in the passive first operating mode and the voltage at the output terminal 54 is the same as the voltage at the input terminal 52. If the voltage at the output terminal 54 attempts to meet or exceed the maximum DC voltage, the control system 58 places the voltage regulation device 56 in the active second operating mode to limit the DC voltage at the output terminal 54 to the maximum DC voltage. When the DC voltage at the output terminal falls below the maximum voltage, the control circuit 58 returns the voltage regulation device 56 back to the passive first operating mode.

Figure 8:
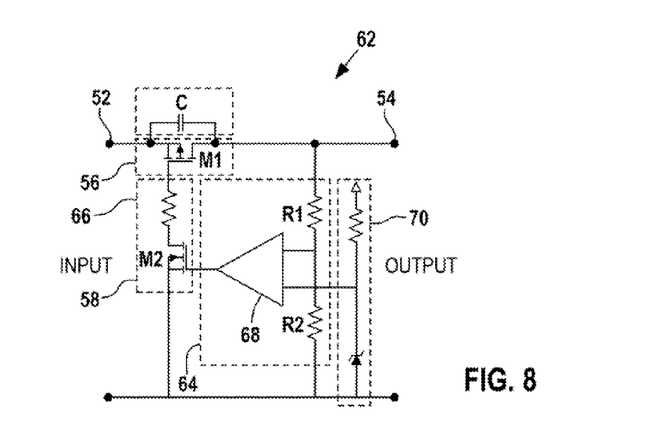
FIG. 8 illustrates a linear voltage regulator that can be adapted for use with the voltage limiting device.

FIG. 8 illustrates a linear voltage regulator circuit 62 that can be adapted for use in the voltage limiting device 24. The voltage regulator circuit 62 is shown as having an AC signal device 60 formed as a capacitor C that enables AC signals to be transmitted between the input terminal 52 and the output terminal 54 of the regulator circuit 62.

In FIG. 8, the voltage regulation device 56 is realized as a power MOSFET M1 connected in series with the input terminal 52 and the output terminal 54, with the source terminal of the MOSFET M1 connected to the input terminal 52 and the drain terminal of the MOSFET M1 connected to the output terminal 54.

The control device 58 is connected to the gate of the MOSFET M1 and includes a monitoring device 64 connected to a drive device 66. The monitoring device 64 includes an operational amplifier 68 that in effect compares the output voltage at the output terminal 54 with a reference voltage provided by a conventional voltage reference 70. The resulting error output of the operational amplifier 68 is connected to the gate of a power MOSFET M2 that forms part of the drive device 66. The drain of the MOSFET M2 is connected to the gate of the MOSFET M1 and the source of the MOSFET M2 is connected to ground.

The capacitor C is connected in parallel with the MOSFET M1 between the input and output terminals 52, 54 and enables transmission of an AC data signal 30 between the input and output terminals.

In operation, the MOSFET M1 acts as a variable resistor in series with the input and output terminals. The resistance of the variable resistor M1 is controlled by the MOSFET M2 that is in turn controlled by the error signal generated by the operational amplifier 68.

Figure 9:
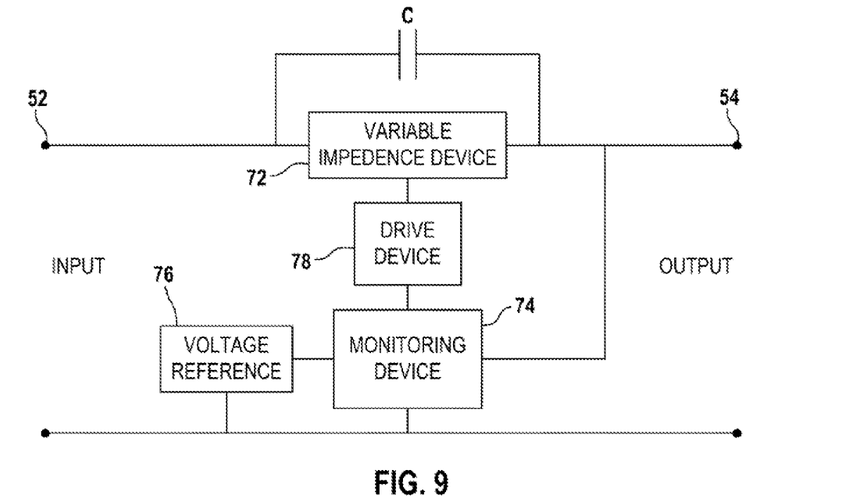
FIG. 9 is a block circuit diagram of a voltage limiting device utilizing a first linear voltage regulator topology.

FIG. 9 is a block circuit diagram of a voltage limiting device 24 utilizing a linear power regulator topology adapted from the linear power regulator circuit 62. The voltage regulation device 56 is formed as a variable impedance device 72 and the control device 58 is formed from a monitoring device 74 connected to a drive device 78. The monitoring device 74 monitors the voltage difference between the DC output voltage at the output terminal 54 and a voltage reference 76. The output of the monitoring device 74 is connected to the drive circuit 78 which in turn is connected to the variable impedance device 72. The drive device 78 changes the impedance of the variable impedance device 72 in response to the output of the monitoring device 74. The AC signal device 60 is formed as a capacitor C connected between the input terminal 52 and the output terminal 54 in parallel with the variable impedance 72.

Figure 10:
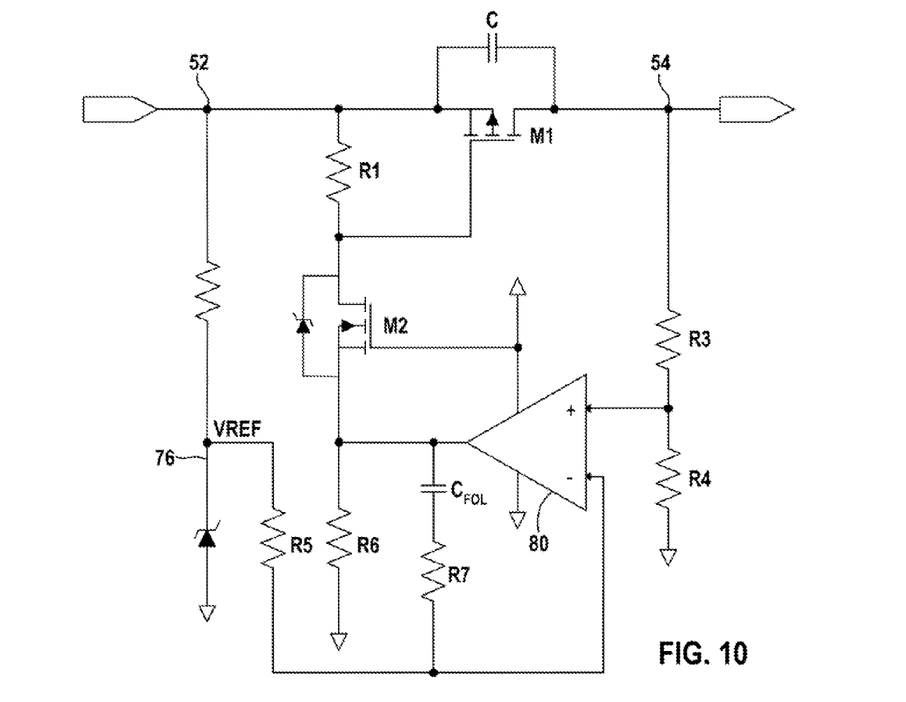
FIG. 10 is a circuit diagram of a voltage limiting device with the topology shown in FIG. 9.

FIG. 10 illustrates a voltage limiting device 24 embodying the circuit topology shown in FIG. 9.

The variable impedance device 72 is formed as a power MOSFET M1 connected in series with the input terminal 52 and the output terminal 54, with the source terminal of the MOSFET M1 connected to the input terminal 52 and the drain terminal of the MOSFET M1 connected to the output terminal 54. The AC signal device 60 is formed as a capacitor C connected in parallel with the MOSFET M1 between the input and output terminals 52, 54 and enables transmission of AC data signals 30 between the input and output terminals 52, 54.

The monitoring device 74 includes an operational amplifier 80 and a voltage reference 76. The drive device 78 extends between the input terminal 56 and ground and includes a resistor R1 connected to the input terminal 52 in series with a resistor R6 connected to ground. A power MOSFET M2 is in series with the resistors R1, R6, with the source of the MOSFET M2 connected to resistor R6 and the drain of the MOSFET M2 connected to the resistor R1.

The operational amplifier 80 has a non-inverting input that receives the output terminal voltage through a voltage divider formed from series resistors R3 and R4 extending between the output terminal 54 and ground. The inverting input of the operational amplifier 80 receives a reference voltage VREF from the voltage reference 76.

An AC voltage follower provides negative feedback from the output of the operational amplifier 80 to the inverting input of the operational amplifier. The AC voltage follower acts to follow the AC signal in the voltage supplied to the non-inverting input and is formed from a capacitor $C_{FOL}$ in series with a resistor R7. The capacitor $C_{FOL}$ permits only the AC data signal component of the voltage received through the non-inverting input to be fed back to the inverting input, and blocks the DC component of the voltage. Thus by utilizing unity gain in the feedback loop, the AC data signal component of the voltage supplied to the non-inverting input is effectively removed from the output signal of the operational amplifier 80 by the negative feedback of the AC voltage follower.

By removing the AC signal component from the output of the operational amplifier, the output represents the voltage difference between the DC voltage component at the output terminal and the reference voltage. As a result the drive circuit 78 is being controlled by the DC voltage component and is not affected by the AC signal component.

The ratio of R4/R3 and R5/R7 sets the amplitude of the AC voltage follower. If R4/R3=R5/R7, then unity gain is achieved for all frequencies where $(R5+R7) \gg Z_{CFOLL}$ where $Z_{CFOLL}$ is the impedance of $C_{FOL}$ at a given frequency.

Operation of the voltage limiting device 24 shown in FIG. 10 to limit the maximum DC voltage component 28 transmitted to the spur circuit 14 is described next. Assuming the operational amplifier 80 is an ideal amplifier, the DC voltage to which the voltage limiting device 24 will regulate (limit) is:

$$V_{DCmax\text{-}output} = (VREF/R4)*(R3+R4)$$

In the illustrated embodiment, the values of VREF, R3, and R4 are selected to limit maximum DC voltage output to 24 volts.

When the input voltage is less than 24 volts, and assuming M1 is an ideal MOSFET, $$V_{DC\text{-}output} = V_{DC\text{-}input}$$

The voltage regulation device operates in a passive mode while the DC component of the input voltage is less than or equal to a predetermined maximum DC voltage. The voltage regulation device when in the passive mode merely transfers the DC voltage component at the input terminal to the output terminal. The voltage regulation device operates in an active mode limiting the DC voltage transferred to the output terminal to the maximum DC voltage when the DC voltage component at the input voltage exceeds the maximum DC voltage.

Figure 11:
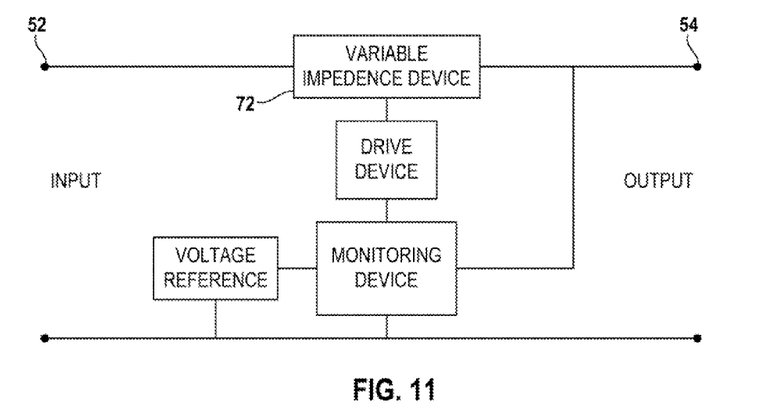
FIG. 11 is a block circuit diagram of a voltage limiting device utilizing a second linear voltage regulator topology.

FIG. 11 is a block circuit diagram of a voltage limiting device 24 that is similar to the diagram shown in FIG. 8. In this embodiment, however, the variable impedance device 72 also transmits the AC data signal between the input terminal 52 and the output terminal 54.

Figure 12:
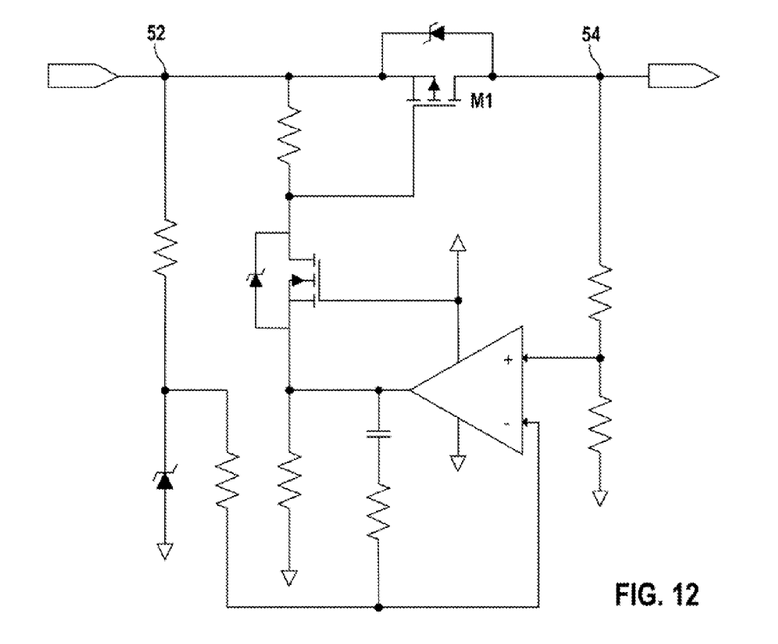
FIG. 12 is a circuit diagram of a voltage limiting device with the topology shown in FIG. 11.

FIG. 12 illustrates a voltage limiting device 24 embodying the circuit topology shown in FIG. 11. The device shown in FIG. 12 is similar to the device shown in FIG. 10 but does not include a capacitor across MOSFET M1. In this embodiment, however, MOSFET M1 actively modulates the AC signal from the input terminal 52 to the output terminal 54. MOSFET M1 is dynamic in the appropriate AC frequency range, enabling elimination of the capacitor C to reduce component count. The frequency response of the circuitry shown in FIG. 12 must be such that the circuitry can follow and modulate the AC signal in real-time, generally requiring higher cost components.

Figure 13:
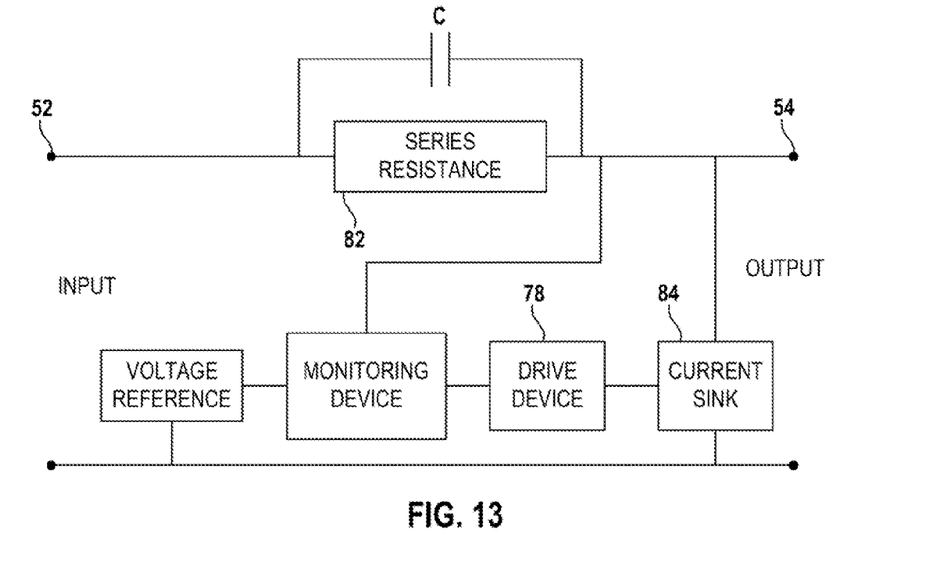
FIG. 13 is a block circuit diagram of a voltage limiting device utilizing a third linear voltage regulator topology.

FIG. 13 is a block circuit diagram of a voltage limiting device 24 utilizing a different linear power regulator topology. The voltage regulation device 56 is formed as a fixed resistance 82 and a current sink 84. The resistance 82 is in series with the input terminal 52 and the output terminal 54, with the current sink 84 connected between the output side of the resistance 82 and ground. The drive device 78 regulates the current flow through the current sink 84 to regulate the voltage drop across the resistance 82. The capacitor C carries the AC data signals across the resistance 82.

Figure 14:
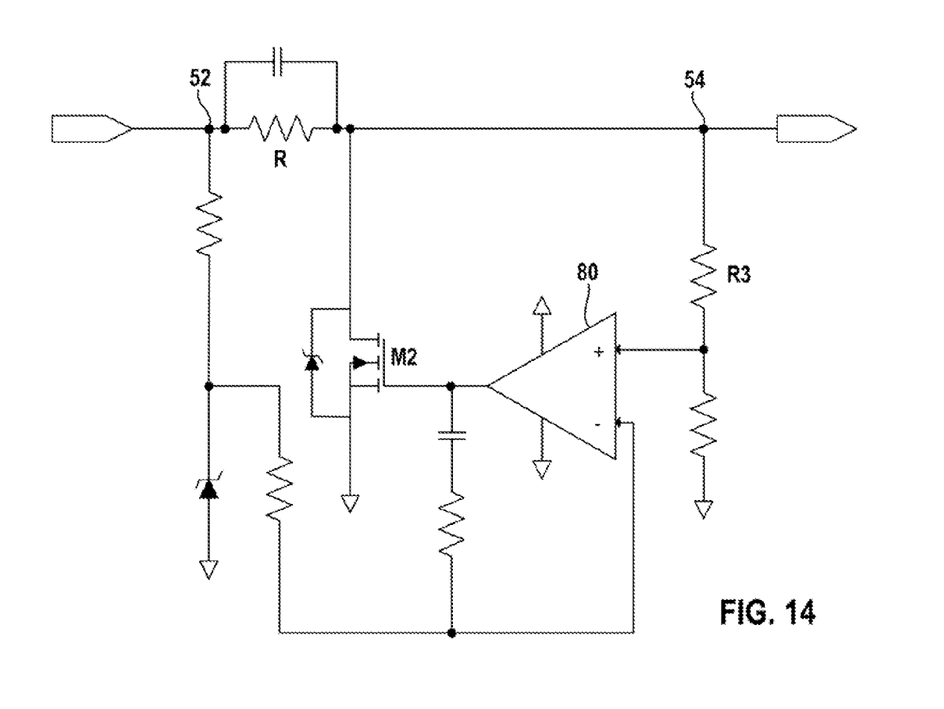
FIG. 14 is a circuit diagram of a voltage limiting device with the topology shown in FIG. 13.

FIG. 14 illustrates a voltage limiting device 24 embodying the circuit topology shown in FIG. 13. Only circuit differences between the embodiment shown in FIG. 10 and the embodiment shown in FIG. 14 will be discussed.

The series resistance 82 is formed as a resistor R connected in series between the input terminal 52 and the output terminal 54, with a capacitor C extending in parallel across the resister R. The M2 source terminal is connected to ground and the M2 drain terminal is connected directly to the output side of the resistor R. The MOSFET M2 forms both the drive device 78 and the current sink 84. The output of the operational amplifier 80 is connected to the M2 gate terminal.

Operation of the voltage limiting device 24 shown in FIG. 14 to limit the maximum DC voltage component 28 transmitted to the spur circuit 14 is described next. The operation of the monitoring device 74 is the same as previously described for the device 26 shown in FIG. 10.

When the DC component of the input voltage is greater than 24 volts, and assuming the current flow through R3 to be negligible, the DC current shunted to ground F— to maintain the desired maximum DC output voltage is:

$$I_{M2}=(V_{DC\text{-}input}-24V)/R-I_{DC\text{-}output}$$

Therefore the value of R needs to be such that:

$$R>(V_{DC\text{-}input}-24V)/I_{DC\text{-}output}$$

The optimal value for R such that the current shunted to ground is effectively zero is:

$$R=(V_{DC\text{-}input}-24V)/I_{DC\text{-}output}$$

As current load on a device coupler is static, the fixed resistor R could, in other embodiments, be provided as a potentiometer ("fixed resistance" meaning that during normal operation of the voltage limiting device in regulating voltage, the resistance of the resistor R is essentially a constant resistance). Forming the resistor R as a potentiometer (resistor with manually variable resistance) would allow a user to vary the fixed resistance of the resistor R and "tune" the device for a specific application to minimize the power dissipated in shunting current to ground.

Figure 15:
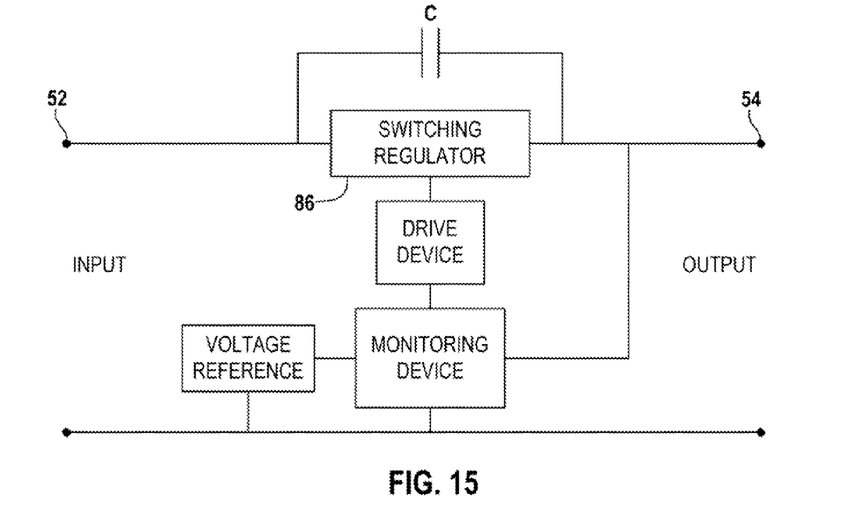
FIG. 15 is a block circuit of a voltage limiting device utilizing a switch mode voltage regulation topology.

FIG. 15 is a block circuit diagram of a voltage limiting device 24 utilizing a switch-mode voltage regulator topology. Voltage regulation is accomplished using a switching voltage regulator 86 disposed between the input terminal 52 and the output terminal 56. In the illustrated embodiment a capacitor C transfers the AC data signals across the voltage regulator 86.

Figure 16:
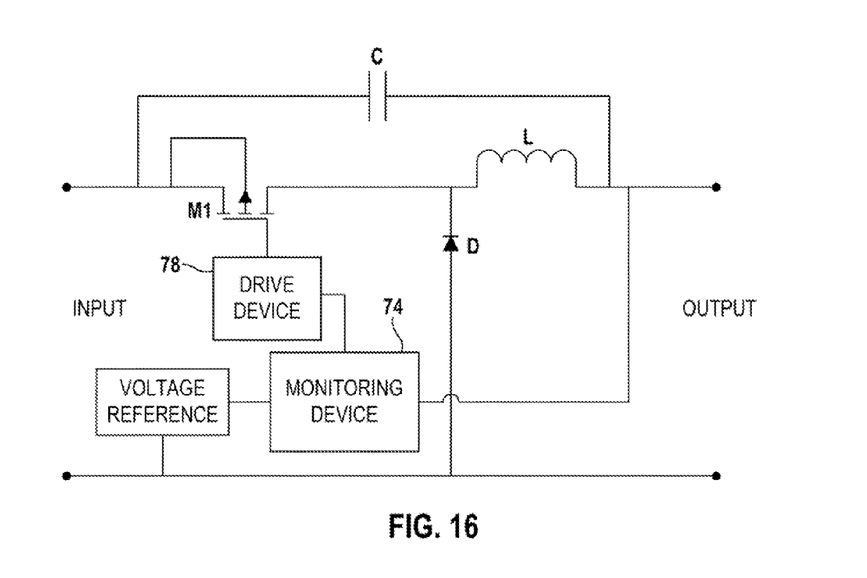
FIG. 16 is a circuit diagram of a voltage limiting device with the topology shown in FIG. 15.

FIG. 16 illustrates a voltage limiting device 24 embodying the circuit topology shown in FIG. 15. The illustrated device 24 utilizes a buck regulator topology to regulate the DC voltage component at the input terminal 52. The MOSFET M1 acts as a switch and is connected in series with an inductor L between the input terminal 52 and the output terminal 54. A catch diode D is connected between the MOSFET M1 and the inductor L. The drive device 78 is responsive to the monitoring device 74 previously described to control the switching operation of the MOSFET M1.

Embodiments of the voltage limiting device may include duplicate circuitry, circuitry modules, or components to provide redundancy. The redundancy may be in the form of standby redundancy, wherein one element or module is idle unless another element or module fails. Load sharing is the preferred redundancy mode because load sharing reduces the stress on the shared circuits, increasing the overall lifetime of the device.

The illustrated embodiments utilize a capacitor $C_{FOL}$ in forming an AC voltage follower to subtract AC voltage from the output of the voltage monitoring device. In other embodiments, bandpass filters or other filter circuits may be used to remove AC voltage components.

If the AC voltage component is not completely removed from the voltage being compared with the reference voltage, there may be some "ripple" in the output voltage of the voltage monitoring device. The ripple can be kept below a minimum amplitude such that the output is effectively a DC output. In other embodiments the drive circuit may compensate for the AC ripple, or the voltage threshold for switching operation mode of the voltage regulating device is set to compensate for the AC voltage component.

In yet other embodiments of device couplers or other component parts incorporating a voltage limiting device may include redundant devices or components in the event of device failure.

Further embodiments of control networks may include one or more voltage limiting devices 24 not in series with a current limiting device 26 if the network application does not require current limiting.

While this disclosure discloses and describes one or more embodiments, it is understood that this is capable of modification and that the disclosure is not limited to the precise details set forth, but includes such changes and alterations as fall within the purview of the following claims.

What is claimed is:

1. A voltage limiting device to limit DC voltage transmitted from a trunk circuit to a spur circuit of a distributed control network in which the trunk circuit cooperates with the spur circuit in transmitting AC voltage data signals superimposed on the DC voltage between a field device attached to the spur circuit and a control processor attached to the trunk circuit, the voltage limiting device comprising:

an input terminal for receiving an input voltage from the trunk circuit;

an output terminal for supplying an output voltage to the spur circuit;

a voltage regulation device connecting the input terminal with the output terminal, the voltage regulation device being configured to deliver an output voltage to the output terminal based upon the input voltage from the trunk circuit, the voltage regulation device being operable in a first mode wherein the output voltage is equal to the input voltage, the voltage regulation device being operable in a second mode wherein the output voltage is equal to a threshold voltage;

a control device connected to the output terminal and to the voltage regulation device, the control device being configured to place the voltage regulation device in the first operating mode when the voltage at the output terminal is below the threshold voltage, the control device being configured to place the voltage regulation device in the second operating mode when the voltage at the output terminal exceeds the threshold value or would exceed the threshold value if the voltage regulation device were operating in the first mode; and an AC signal device connected to the input and output terminals in parallel with the voltage regulation device, the AC signal device configured to carry the AC data signals between the input and output terminals while the voltage regulation device is operating in the second mode.

2. The voltage limiting device of claim 1 wherein the voltage regulation device comprises a linear voltage regulator.

3. The voltage limiting device of claim 2 wherein the linear voltage regulator comprises a variable impedance device.

4. The voltage limiting device of claim 3 wherein the variable impedance device comprises a MOSFET connected in series with the input terminal and the output terminal.

5. The voltage limiting device of claim 2 wherein the linear voltage regulator comprises a fixed resistance and a current sink, the fixed resistance in series with the input terminal and the output terminal, and the current sink connected to the fixed resistance.

6. The voltage limiting device of claim 1 in series with a current limiting device.

7. The voltage limiting device of claim 1 wherein the voltage limiting device is in a housing, the housing comprising an external set of the trunk circuit terminals and one or more external sets of spur circuit terminals, one or more current limiting devices in the housing, the set of trunk circuit terminals in series with the voltage limiting device and configured for electrically connecting the trunk circuit to the voltage limiting device, each set of spur circuit terminals in series with a respective one of said one or more current limiting devices, and wherein the voltage limiting device is in series with each of the said one or more current limiting devices.

8. The voltage limiting device of claim 1 wherein the AC signal device comprises a capacitor or a capacitance element.

9. The voltage limiting device of claim 1 wherein the AC signal device comprises a variable resistance device.

10. The voltage limiting device of claim 1 wherein the control device comprises a monitoring device that compares a first voltage related to the voltage at the output terminal with a reference voltage.

11. The voltage limiting device of claim 10 wherein the monitoring device is operable to remove at least a portion of an AC voltage from the first voltage when comparing the first voltage with the reference voltage.

12. The voltage limiting device of claim 11 wherein the monitoring device comprises an operational amplifier and an AC follower circuit feeding back an AC voltage to the operational amplifier.

13. The voltage limiting device of claim 11 wherein the control device comprises a MOSFET having a gate, the output of the operational amplifier connected to the gate.

14. The voltage limiting device of claim 1 connected to a trunk circuit of a distributed control network, the trunk circuit transmitting AC data signals superimposed on a DC voltage.

15. A method of limiting DC voltage transmitted from a trunk circuit to a spur circuit of a distributed control network in which the trunk circuit cooperates with the spur circuit in transmitting AC voltage data signals superimposed on the DC voltage between a field device attached to the spur circuit and a control processor attached to the trunk circuit, the method comprising the steps of:

a) monitoring the voltage being transferred from the trunk circuit to the spur circuit;

b) if the monitored voltage is at or below a predetermined maximum voltage, transferring the voltage from the trunk circuit to the spur circuit without substantially changing the voltage being transferred;

c) if the monitored voltage is above the maximum voltage, limiting the voltage being transferred to the spur circuit to the maximum voltage; and d) while performing step c), passing the AC data signals between the trunk circuit and the spur circuit.

16. The method of step 15 comprising the steps of:

e) comparing a first voltage representing the voltage being transferred to the spur circuit with a second voltage serving as a reference voltage;

f) if the first voltage is less than or equal to the second voltage, performing step b); and g) if the first voltage is greater than the second voltage, performing step c).

17. The method of claim 15 wherein step c) comprises the step of:

e) limiting the voltage being transferred to the spur circuit using a linear voltage regulator.

18. The method of claim 15 wherein step c) comprises the step of:

e) limiting the voltage being transferred to the spur circuit using a switch mode voltage regulator.

19. The method of claim 15 wherein step c) is performed by a voltage limiting device in series with a current limiting device.

20. The method of claim 15 wherein the field device is located in a hazardous zone requiring intrinsic safety and the trunk circuit further transmits AC data signals between one or more additional field devices located in a safe area and the command processor.

* * * * *

UNITED STATES PATENT AND TRADEMARK OFFICE
CERTIFICATE OF CORRECTION

PATENT NO. : 9,684,322 B2  
APPLICATION NO. : 14/430011  
DATED : June 20, 2017  
INVENTOR(S) : Cherewka et al.

It is certified that error appears in the above-identified patent and that said Letters Patent is hereby corrected as shown below:

In the Claims

Column 11, Line 47, delete "the".

Signed and Sealed this
Third Day of October, 2017

Joseph Matal
*Performing the Functions and Duties of the*
*Under Secretary of Commerce for Intellectual Property and*
*Director of the United States Patent and Trademark Office*